(12) United States Patent
Peters (10) Patent No.: US 6,861,134 B1
(45) Date of Patent: Mar. 1, 2005

(54) RETROREFLECTIVE ARTICLES OF NANOPOROUS CONSTRUCTION AND METHOD FOR THE MANUFACTURE THEREOF

(75) Inventor: Eric M. Peters, Sulligent, AL (US)

(73) Assignee: Omnova Solutions Inc., Fairlawn, OH (US)

( * ) Notice: Subject to any disclaimer, the term of this patent is extended or adjusted under 35 U.S.C. 154(b) by 471 days.

(21) Appl. No.: 09/824,612

(22) Filed: Apr. 2, 2001

(51) Int. Cl.[7] .............................. B32B 3/26; B32B 3/00
(52) U.S. Cl. ................... 428/319.1; 428/315.5; 428/315.7; 428/315.9; 428/318.4; 359/529; 359/530; 359/531; 359/532; 359/533
(58) Field of Search ...................... 428/315.5, 315.7, 428/315.9, 318.4, 319.1; 359/529–533

(56) References Cited

U.S. PATENT DOCUMENTS

| | | | |
|---|---|---|---|
| 3,469,898 A | | 9/1969 | Altman |
| 3,785,719 A | * | 1/1974 | Jonnes ........................ 359/538 |
| 4,508,776 A | | 4/1985 | Smith |
| 4,534,673 A | * | 8/1985 | May ............................ 404/14 |
| 4,567,072 A | | 1/1986 | Brainard et al. |
| 4,608,299 A | | 8/1986 | Nomi |
| 4,774,129 A | | 9/1988 | Komiyama |
| 4,858,282 A | | 8/1989 | DuPont, Jr. |
| 5,047,283 A | | 9/1991 | Leatherman et al. |
| 5,055,338 A | | 10/1991 | Sheth et al. |
| 5,082,715 A | * | 1/1992 | Lasch et al. ................. 428/143 |
| 5,128,804 A | | 7/1992 | Lightle et al. |
| 5,207,852 A | | 5/1993 | Lightle et al. |
| 5,411,351 A | | 5/1995 | Lasch et al. |
| 5,660,768 A | | 8/1997 | Walter |
| 5,673,148 A | * | 9/1997 | Morris et al. ................ 359/536 |
| 5,695,853 A | | 12/1997 | Billingsley et al. |
| 5,750,242 A | | 5/1998 | Culler |
| 5,853,846 A | | 12/1998 | Clark et al. |
| 5,882,771 A | | 3/1999 | Klein et al. |
| 5,902,673 A | | 5/1999 | Missell et al. |
| 5,955,175 A | | 9/1999 | Culler |

OTHER PUBLICATIONS

*Mirrors: Reflecting on Materials for Substrates and Coatings, The Photonics Design and Applications Handbook,* 1996 pp. H–400–H–402.
*Tiny Mineral Fillers Bring Big Benefits in Compounding, Modern Plastics,* Nov. 2000, pp. 72–74.
*Technology The Science of Small, Forbes Magazine,* Feb. 5, 2001, pp. 124, 125 and 128.

* cited by examiner

Primary Examiner—Terrel Morris
Assistant Examiner—Hai Vo
(74) Attorney, Agent, or Firm—Renner, Kenner, Greive, Bobak, Taylor & Weber; David G. Burleson (57) ABSTRACT

A retroreflective article comprises a) a microporous substrate (52) containing a plurality of pores (56) which are less than 0.5 μm in diameter; and b) a layer of reflective material (54) located on the surface (58) of the substrate such that the reflective material layer at least partially obscures a plurality of the pores of the substrate. A method for the production of a reflective article comprises the steps of a) providing a substrate which contains pores which have a diameter of less than 0.5 μm; and b) applying a layer of reflective material to the substrate in such a way that the reflective material layer at least partially obscures a plurality of the pores of the substrate.

25 Claims, 7 Drawing Sheets

RETROREFLECTIVE ARTICLES OF NANOPOROUS CONSTRUCTION AND METHOD FOR THE MANUFACTURE THEREOF

BACKGROUND ART

This invention relates to reflective materials. Specifically, this invention relates to reflective materials known as light directing materials. More specifically, this invention relates to light directing materials based on substrates containing nanopores.

Light directing materials are used in a number of applications. Light directing materials can use reflection or refraction to direct the incident light in the desired direction. The most common type returns the incident light in the angle of incident (retroreflective). Least common and most complicated are surface relief holograms which direct reflections to form an image which appears three-dimensional. Retroreflective surfaces are commonly used in applications where low light levels can create safety hazards. These applications include use in road signs and safety clothing. In many states, the use of retroreflective material in road signage is mandated by law. Retroreflective surfaces are typically superior to other reflective surfaces because retroreflective surfaces reflect a portion of the incident light striking their surfaces in rays parallel to the incident rays. Flat surfaces, however, display this property only for light that is normal to the surface. In all other circumstances, light is reflected from a flat surface at an angle of reflection that is equal to the angle of incidence from the surface normal, but opposite in direction to the angle of incidence. Therefore, retroreflective surfaces are generally more highly visible when illuminated from the point of the observer.

Several approaches are currently used to create retroreflective surfaces. One such approach is the use of spherical micro-bubbles or beads made of glass or other materials to form a retroreflective layer. U.S. Pat. Nos. 5,128,804, 5,207,852, 5,695,853, 5,853,846, and 5,882,771 disclose retroreflective materials of this type. This type of surface 10, is schematically displayed in FIG. 1. Typically, glass microspheres or microbubbles 11 are applied over a release sheet or a clear carrier sheet 12 in a clear base resin. This coating is kept very thin to minimize internal scattering and absorption of light by the microspheres. This thin coating creates a textured surface, the hard glass spheres protruding from the coating as the coating dries or chemically cures and shrinks. A layer of aluminum 13 or other metal is evaporated on the textured surface to create spherical micro-reflectors on the back of the sheet. A portion of the light entering the smooth side is reflected back at the angle of incidence from the spherical micro-mirrors on the back of the sheet. An adhesive 14 is applied onto the metal.

Figure 1:
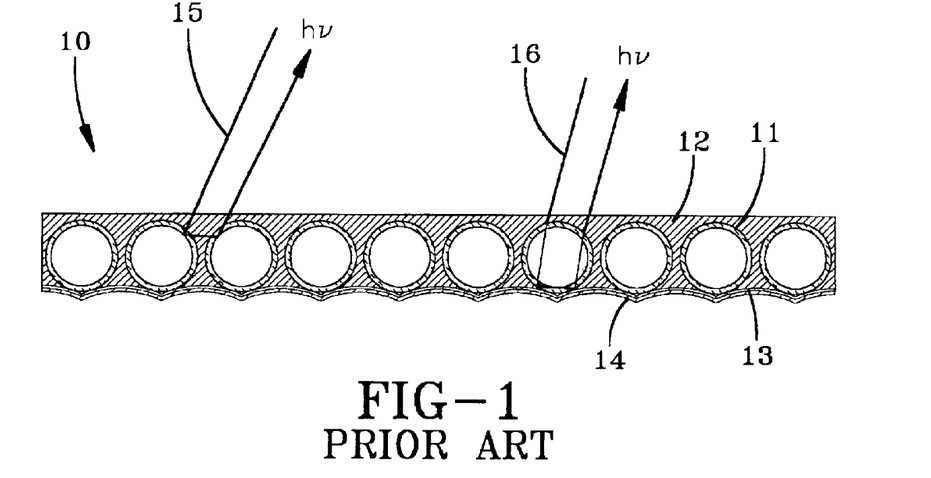
FIG. 1 is a schematic cross sectional view of the prior art microsphere type retroreflective film.

Light striking this type of surface may be reflected in one of two ways. First, due to the differences in reflective index between the glass and the polymer resin, a portion of the incident light is reflected off the surface of the sphere, as at 15. The close packed spheres reflect this light between the spheres and a very small portion of the incident light is returned to the light source. Second, light enters the microspheres and reflects off the spherical micro-mirrors at the back of the sheet, a portion of this light, as at 16. A portion of the reflected light is then refocused to return the rays at the angle of incident.

Figure 2:
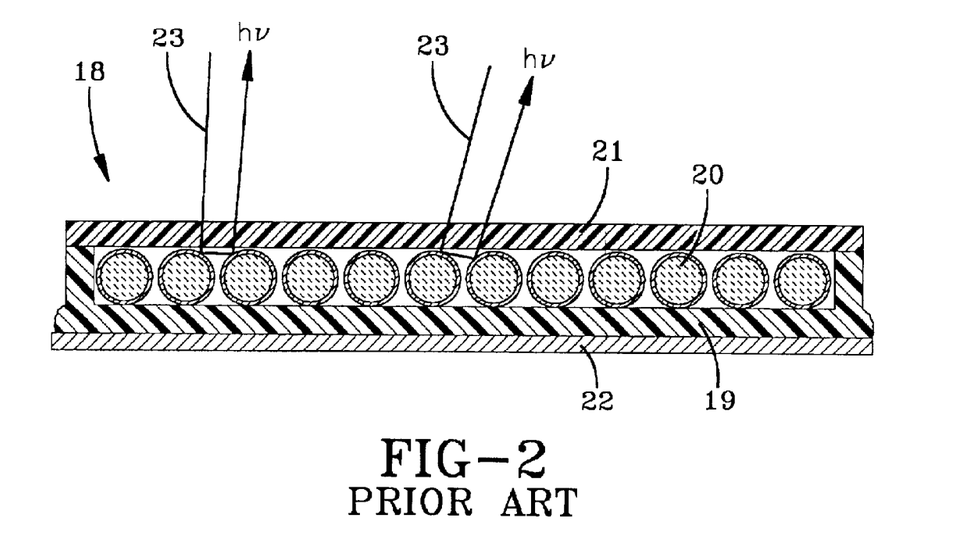
FIG. 2 is a schematic cross sectional view of the prior art high intensity type retroreflective film.

Another approach used for retroreflective surfaces utilizes a honeycomb type structure 18 as shown in FIG. 2. The backing 19 of the honeycomb structure is made from a plastic such as PVC. The depressions in the honeycomb structure are then filled with spherical colloidal metal particles or metallized glass spheres 20 in a monolayer. A clear top sheet 21 is bonded to the honeycomb sheet and adhesive 22 and backing material 19 are then applied. Similar to the microsphere material 10, the incident light rays 23 are reflected off the metal surfaces of the close packed spheres and a portion returned at the angle of incidence.

Figure 3:
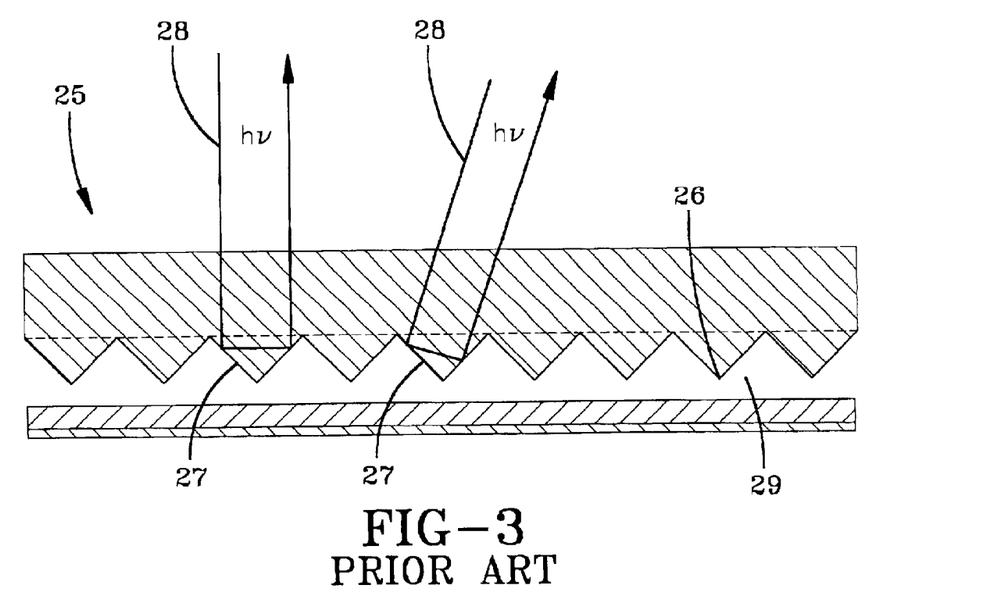
FIG. 3 is a schematic cross sectional view of the prior art cube corner type retroreflective film.

Another retroreflective material type utilizes corner cube design and total internal reflection to create a retroreflective effect. This design 25 is represented in FIG. 3. In this type of material, the back surface of the material has a repeating corner cube structure. This structure appears as the shape of the corner of a cube 26, which has been sliced off of a cube. Incident light enters through the flat front surface and strikes one facet 27 of the corner cube. Visible light 28 is almost totally reflected off the facet surface due to the refractive index of the cube material and air 29. The light is reflected to one or more of the other facets in such a way that a portion of the light is reflected back toward the light source. One example of the use of this design is demonstrated in U.S. Pat. No. 5,660,768.

It should be noted that only a portion of the incident light striking any of the above described retroreflective surfaces is transmitted back toward the source. Other portions are absorbed by the materials comprising the reflective surface or are reflected in other directions. Depending on the materials used, a portion of the incident light may also be transmitted through the optical materials of the retroreflective surface or metal layer.

Examples of these types of retroreflective surfaces are commercially available. These products, however, exhibit certain undesirable characteristics. Among these are the use of a rigid rather than a flexible support backing, increasing the difficulty of transporting the product and using it in certain circumstances. Such material, for example, cannot be easily stored in rolls or applied to curved surfaces. Another drawback regarding currently available materials relates to the propensity of some plastics to absorb water. Over time, water migrates through the material, causing hazing and cracking of the material during temperature cycling. Therefore, it would be advantageous to be able to use a water resistant base material for a retroreflective surface. It would also be advantageous to use a material that can be coated with a water resistant coating such as an aliphatic polyurethane or a polyolefin. Finally, it would be advantageous to develop a retroreflective article that maximized the amount of light it reflected.

BRIEF SUMMARY OF THE INVENTION

It is therefore an aspect of the present invention to provide a retroreflective article having improved optical performance.

It is another aspect of the present invention to provide a retroreflective article that is flexible.

It is another aspect of the present invention to provide a retroreflective article that is weather resistant.

It is another aspect of the present invention to provide a retroreflective article that can be bonded readily to an adhesive material or to a thermoplastic resin.

It is another aspect of the present invention to provide a method for the manufacture of retroreflective articles.

It is still another aspect of the present invention to provide a variety of products carrying retroreflective articles of the present invention.

At least one or more of the foregoing aspects, together with the advantages thereof over the known art relating to retroreflective surfaces, which shall become apparent from the specification which follows, are accomplished by the invention as hereinafter described and claimed.

In general, a retroreflective article of the present invention comprises a) a microporous substrate containing a plurality of pores which are less than 0.5 µm in diameter; and b) a layer of reflective material located on the surface of the substrate such that the reflective material layer at least partially obscures a plurality of the pores of the substrate.

A method for the production of a reflective article is also provided and comprises the steps of a) providing a substrate which contains pores which have a diameter of less than 0.5 µm; and b) applying a layer of reflective material to the substrate in such a way that the reflective material layer at least partially obscures a plurality of the pores of the substrate.

Additionally, the microporous nature of the substrate may extend from the side on which the reflective material is deposited to the opposite side. A microporous nature on the back of the substrate will allow the bonding of adhesives to the article as well as the fusion of other materials such as plastic materials.

DETAILED DESCRIPTION OF THE INVENTION

The retroreflective article of the present invention comprises a reflective microporous substrate. Within this specification, the term microporous refers to articles containing pores smaller than 0.5 µm in diameter. According to this aspect of the invention, the layer or film of the reflective material obscures the pores in the substrate material. While not wishing to be bound by any particular theory of operation as a condition for patentability of this invention, the applicant believes that the submicron pores in the material provide a large surface area for adhesion of the reflective material. The reflective material migrates at least partially into these pores, creating a strongly bonded interface between the substrate and the reflective material, and thereby provides a highly flexible or thermal expansion resistant metallized surface.

Figure 4:
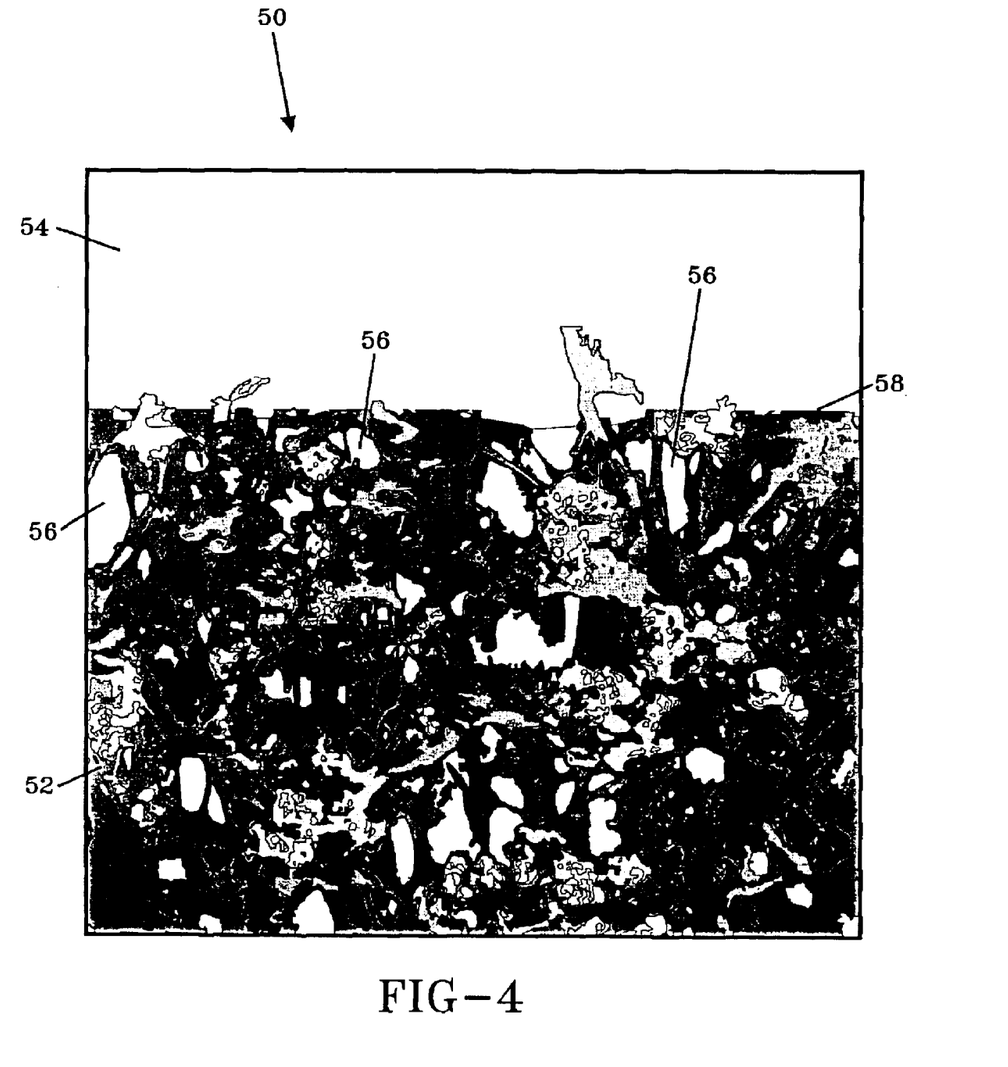
FIG. 4 is a digitized drawing of an SEM pictograph of the retroreflective article of the present invention.

The article of the present invention may be described with reference to the schematic representation shown in FIG. 4. A reflective article, indicated generally by the numeral 50, is comprised of a microporous substrate 52 and a reflective layer 54. Substrate 52 contains a network of pores 56 which extend from one surface 58 of substrate 52 toward the interior of substrate 52. Reflective layer 54 at least partially obscure pores 56 at the surface of substrate 52. When the substrate is flexible, the strong bonding between the reflective material 54 and the substrate allows flexing and creasing of the substrate without the cracking of the reflective coating. When the pore diameters of the substrate material are less than the wavelength of visible light, 450–800 nanometers (nm), the surface roughness has minimal effect on the reflection of visible light from the reflective layer. Larger surface features can scatter visible light reflections, but roughness less than 0.45 nm is smaller than the wavelength of visible light and does not normally scatter light.

Optionally, article 50 may also comprise a protective coating that overlays the reflective layer 54 protecting it from oxidation. The coating may be clear or tinted. Examples of protective coating materials that may be used include polymeric materials such as; polyurethanes, polymethylmethacrylate and its copolymers (PMMA), styreneacrylonitriles (SAN), polystyrene, polycarbonate, organosiloxanes, and amorphous polyolefins or evaporative dielectric coatings such as $SiO_2$ and $TiO_2$, as well as other transparent coatings. Coating thicknesses are not a limitation of the present invention but for purposes of enablement, these can range from about 0.005 to about 0.010 inches (0.0127 to 0.254 mm). An important consideration for the performance of the article is that the optional coating be very flat and smooth, and if not, then it must be very thin, so as not to interfere with the reflective properties.

The article of the present invention may be formed in any one of a number of shapes that maximizes the amount of light reflected in a predetermined direction or a plurality of directions. In one embodiment, the article of the present invention is a retroreflective article impressed with a repeating corner cube pattern. Additionally, the article may optionally comprise an adhesive placed on the back of the article. The article may also comprise another backing layer, such as a plastic for example, bonded to the substrate. In one embodiment, the substrate has a microporous structure that extends from the metallized surface of the substrate to the opposite surface of the substrate. This microporous nature of the back of the substrate may allow for greater effectiveness of use of adhesives or bonding to additional backing layers such as plastics.

A wide variety of materials may be used as components in the present invention. For example, any material comprising pores with a diameter of less than 0.5 µm may be used as substrate 52. In one embodiment, the substrate is a plastic film material. The thickness of substrate 52 is also variable with the needs of the specific application in which the article will be used. In one embodiment, the thickness of substrate 52 is between about 0.010 and about 0.07 inches (0.254 to 1.778 mm).

The material used to form the reflective layer 54 is also variable and includes both metal coatings and dielectric coatings. Thicknesses for the reflective material layer range from about 0.001 to about 0.0001 inches (about 0.0254 to about 0.00254 mm), so long as the layer has a sufficient thickness to fill the pores in the substrate. Non-limiting examples of metals that can be employed to form the metal coatings or films include aluminum, chromium, nickel, silver and gold. When aluminum is utilized, the aluminum may optionally be protected to prevent oxidation, because oxidation of the aluminum after vacuum coating will decrease the reflective performance of the article.

Metallic coatings are broadband and relatively insensitive to angle. These are the most popular coatings, offering good performance at economic prices. For a more complete discussion of metallic coatings that are suitable for practice of the present invention, see, M. Griot, *The Photonics Design and Applications Handbook*. Book 3, 1996, "Reflecting on Materials for Substrates and Coatings", the subject matter of which is incorporated herein by reference. Exemplary metallic coatings, quoted from the foregoing reference are as follows:

Bare aluminum has a very high reflectance value, but will oxidize over time. Protected aluminum is much preferred over bare aluminum because Its dielectric overcoat arrests the oxidation process. There is some sacrifice in performance, however. Enhanced aluminum is an improved version of the protected aluminum described above, offering higher reflectance values in the mid-visible regions. It is harder than the protected aluminum and offers good abrasion resistance. UV-enhanced aluminum has a dielectric coating which prevents oxidation while preserving aluminum's reflectance in the ultraviolet region. The resultant coating must be cleaned with care since it is not as abrasion-resistant as the enhanced aluminum coatings.

Silver offers better reflection than aluminum in the visible through the near-infrared. It is used in internal reflection applications (e.g. prism faces), since it would otherwise oxidize and tarnish easily. Protected silver maintains the high reflectance of the silver metal in the visible through the near-IR while extending the coating lifetime and improving its durability. For this reason, protected silver can be used in first-surface mirror applications.

Gold offers consistently high reflectance in the near-IR to far-IR and is the most widely used material in these regions. Although chemically and optically stable, gold is very soft and is easily scratched. Protected gold combines the natural spectral performance of gold with the durability of hard dielectrics. Lifetime is improved as a result, and the protected gold coating can be cleaned regularly using standard organic solvents (acetone or alcohol is recommended).

Also useful as a reflective material to form the reflective layer 54 are the dielectric coatings. Dielectric coatings are defined in THE PHOTONICS DICTIONARY as "A high-reflectance coating consisting of alternating layers of quarter-wave film of a higher refractive index and lower refractive index than the substrate. Such coatings can be made very specific to a reflected wavelength or, by varying the layers' thicknesses or film indexes, spread over a wide wavelength interval."

Dielectric coatings are multilayer coatings that offer excellent performance over a specific wavelength range and are relatively insensitive to angle. As a rule, dielectric coatings are very durable and resistant to abrasion. They can be broadband coatings, or they can be optimized for high performance at one specific wavelength and one angle of incidence (0° or 45°). Ibid. M. Griot, page H-400.

In general, the method of the present invention comprises the steps of providing a microporous substrate, and applying a reflective material coating to the substrate in such a way that the reflective material obscures the pores of the substrate. The reflective material layer may be applied by any method that is compatible with the substrate without damaging the substrate.

The reflective metal films are typically deposited on the microporous substrate in a relatively thick layer. This deposition may be measured in terms of reflectivity of the reflective material film. As the thickness of the vacuum deposited layer increases, the reflectivity will increase to theoretical values for the reflective material as less light is transmitted through the reflective material layer. In one particular embodiment, the film is placed in a vacuum chamber, air and any volatile material is removed through pumping and aluminum is vacuum deposited on the film. The optical density of the film is monitored using a glass plate coated along side the samples. Measurement in a spectrophotometer shows the density to be greater than 3 and the reflectivity at about 92 percent of visible light.

Non-limiting examples of metal application are evaporative metal deposition under vacuum, metal sputtering under vacuum, plasma metal deposition under vacuum and thin metal film lamination under heat and pressure. The article may also be further processed to take a specified shape. Such processing may be used to introduce elements which enhance certain optical performance characteristics or disperse the light in more than one direction. As noted above, a corner cube design may optionally be embossed into the surface of the article. A coating layer may optionally be applied to the article after the reflective material has been applied, either before or after processing into a predetermined shape.

Non-limiting examples of dielectric application are evaporative deposition of layers of dielectric materials under vacuum and sputtering of layers of dielectric materials under vacuum. Thin dielectric films can be laminated under heat and pressure from polymeric carrier films. Dielectric mirror applications normally require application of a layer of high refractive index and low index materials. Examples of low index dielectric materials used for visible applications are silicon dioxide, magnesium fluoride and cerium fluoride. Examples of high index dielectric materials used for visible applications are titanium dioxide, yttrium oxide, hafnium oxide and tantalum pentoxide. Application must be of controlled thickness and the dielectric films tend to be brittle; therefore, application may need to occur after embossing or processing of nanoporous films. Single layers of dielectric materials are often applied over metal mirrors to protect and enhance performance.

It is envisioned that the substrate will typically be a polymeric material such as, for example, a polyethylene, polypropylene or poly(tetrafluoroethylene), but other polymers may be used, provided that the surface contains pores that have a diameter less than 0.5 $\mu$m. In one embodiment, the substrate is in the form of a film or non-woven fabric.

The substrate may be formed by any one of a number of methods including carding, wet laying, casting, meltblowing, spunbonding, extrusion, tentering, calendering or combinations thereof. Any suitable method that provides a substrate with the required properties mentioned above could be used. Non-limiting examples of suitable substrates which are commercially available include nanoporous polyethylene battery separator material (U.S. Pat. Nos. 2,940, 830, 3,089,191, 3,917,772, 3,351,495 and 4,681,750), polytetrafluoroethylene membranes used commonly in breathable clothing, filtration and reverse osmosis (W. L. Gore U.S. Pat. Nos. 3,664,915, 3,813,461 and 3,953,566), extruded, tentered polyethylene or propylene membranes used as battery separators (U.S. Pat. No. 3,558,764) and high denier non-woven fabrics with fiber average fiber diameters less than 1 mm can be calendared at high pressures to produce films with these properties (U.S. Pat. Nos. 3,972,759 and 6,120,939). Non-woven fabrics such as these are often used as battery separators, membranes and filter media.

Figure 5:
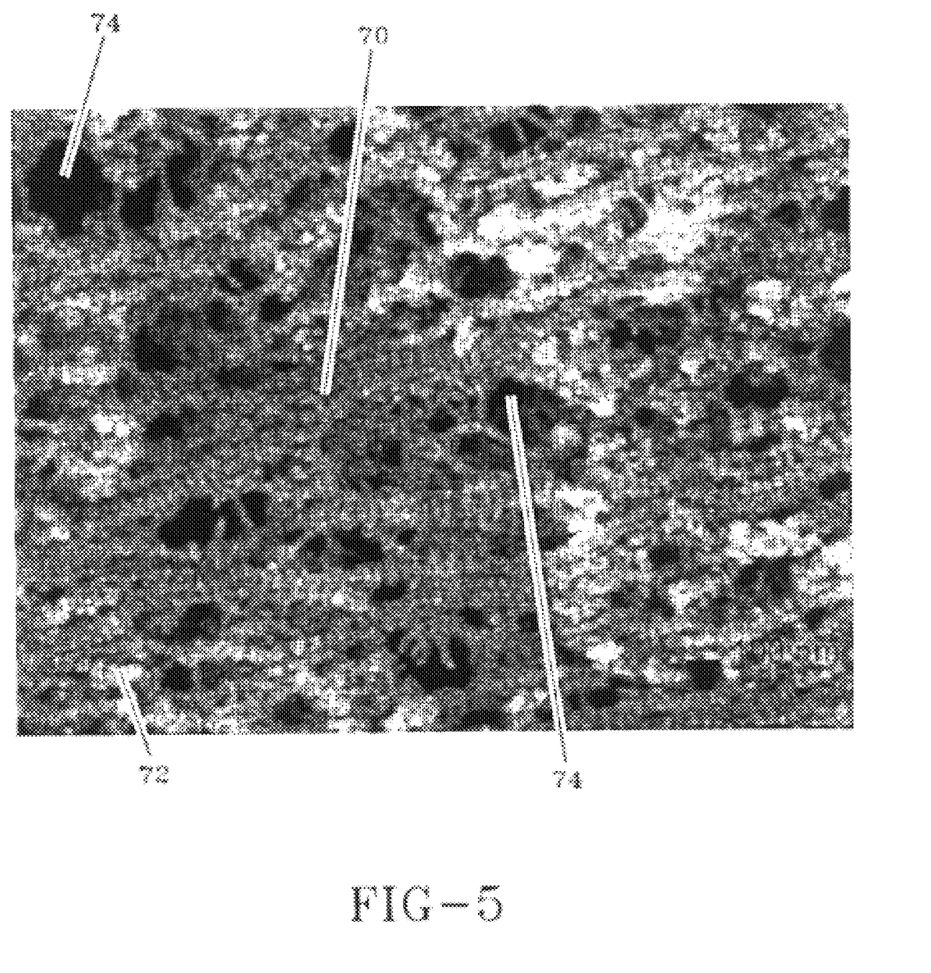
FIG. 5 is an SEM pictograph depicting the surface of a nanoporous membrane useful for the retroreflective article of the present invention.
Figure 6:
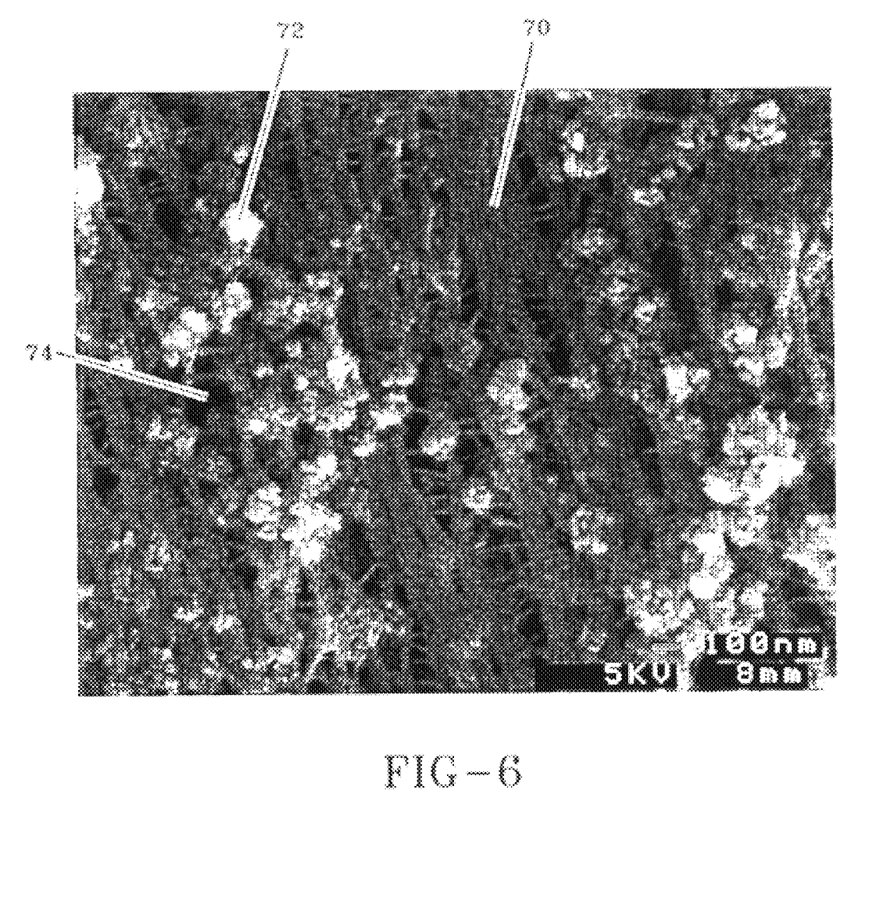
FIG. 6 is another SEM pictograph depicting the surface of a nanoporous membrane useful for the retroreflective article of the present invention.
Figure 7:
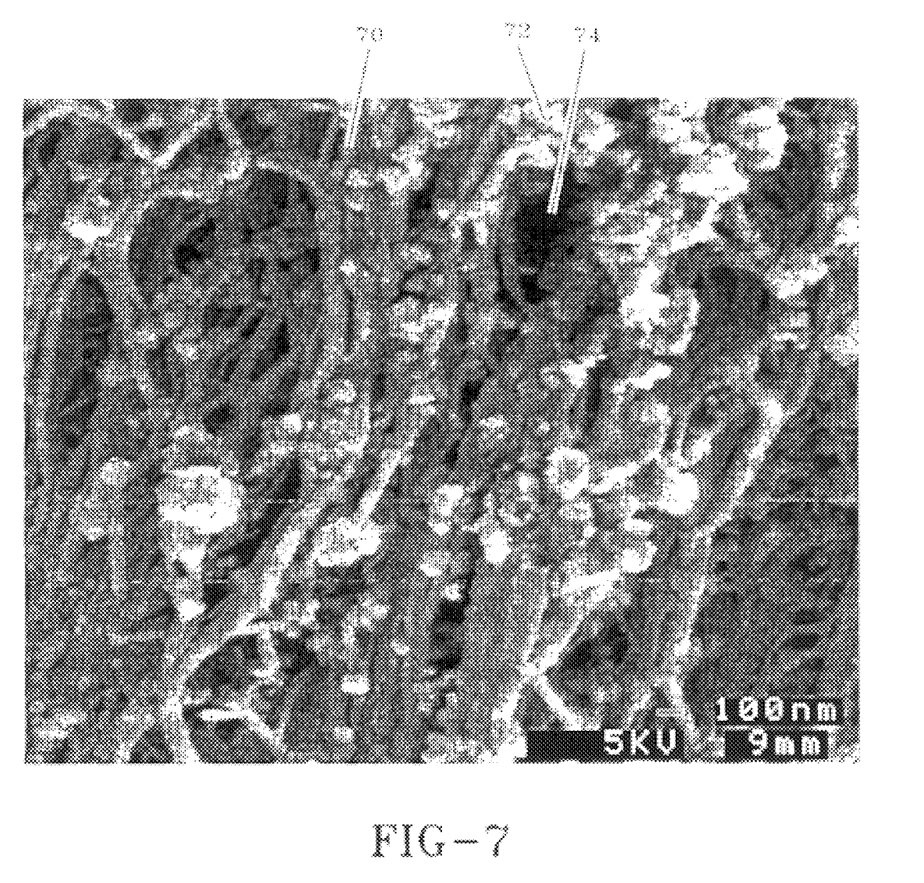
FIG. 7 is another SEM pictograph depicting the surface of a nanoporous membrane useful for the retroreflective article of the present invention.

With reference to FIGS. 5–7, SEM pictographs of a Teslin® nanoporous membrane are depicted. Teslin is a product of PPG Industries, Inc., comprising polyethylene with embedded silica particles, which product can be calendared into thin films for use as printing media. A key on each of the pictographs, indicating a length of 100 nanometers, is provided for reference. In these pictographs, the polyethylene components are depicted by the numeral 70, the silica particles, by the numeral 72 and the pores by the numeral 74. As is clearly evident, the pores are generally around the size of 200 nanometers, which scale and pore size is also applicable to FIG. 4. Teslin is but one example of a suitable substrate material for practice of the present invention and, as the pictographs reveal, the metal layer applied to the substrate will be deposited into pores, smaller than the size of visible light. The pores exist throughout the substrate and thus, as noted hereinabove, the same pores can take up adhesive, thereby creating a very strong bond with the substrate, when the reflective article is utilized to make other products.

The article may optionally be processed to take a specific shape. For example, a design may optionally be embossed into the surface of the article using flat plates or calendar rolls. This processing step may be performed either before or after metallization. Such processing may be used to introduce elements, which enhance certain optical performance characteristics, form visible or invisible image (holographic image) or direct the light in one or more predetermined directions. The thickness of any elements in such a pattern may be as large or as small as desired and is limited only by physical constraints such as the thickness of the substrate.

When calendar rolls are used in this step, they may optionally be heated to decrease the pressure required. In one embodiment, the heating of the calendar rolls is limited to a temperature less than about 240° C. to prevent softening or melting of the substrate material. The pressure used to impress a pattern is less than 300 psi. In one embodiment, a repeating corner cube design is embossed in the article. It has been found in general, that calendar roll pattern replication is enhanced when the calendar rolls are heated for nanoporous materials.

In practice, heating of the calendar rolls or embossing "platen" is required for most nanoporous materials. Heating allows lower pressures to be used and provides better pattern replication and retention in the nanoporous material. The porous nature of the materials lowers the rate of heating and the retention of heat for these films in comparison to normal non-porous films. Conventional embossing, heating the material and pressing with chilled platens or rolls is not always possible.

Figure 8:
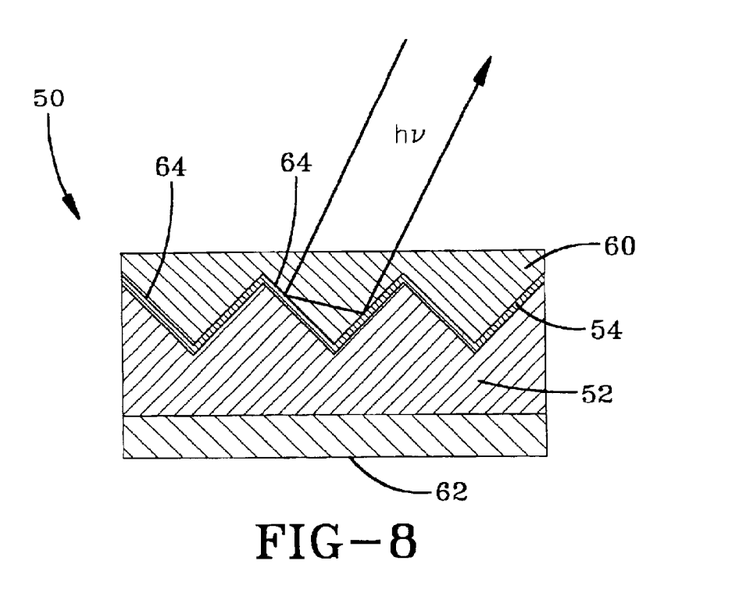
FIG. 8 is a schematic representation of the retroreflective article of the present invention, depicting an embossed surface to improve reflectivity.

With reference to FIG. 8, such a product is depicted as article 50, having a microporous substrate 52, a reflective material layer 54, a transparent protective coating 60 and an optional adhesive layer 62. The reflective material layer 54 has been subjected to an embossing roll via calendering to impart corner cube shaped depressions 64, thereby increasing the retroreflectivity of the article. Such means are well known to those skilled in the art.

Optionally, the reflective article may be printed to produce wording or graphics on the surface of the article. Such wording or graphics may be introduced by inkjet printing, hot stamping or any other method that is compatible with the reflective material or transparent protective coating layer. Additionally, the protective coating layer 60 may also be optionally applied over the reflective material and lettering. This coating layer may be applied either before or after processing the article into a predetermined shape. This coating may be clear or tinted, provided that it does not significantly impair the reflective properties of the article.

Additionally, an adhesive 62 may optionally be applied to the back of the reflective article. Also, an additional backing layer (not shown) may be applied to the reflective article with or without the use of an adhesive. In one embodiment, the backing layer is a polyolefin bound to the article by an insert molding method.

There are several advantages resulting from the retroreflective articles of the present invention. For instance, the article can be mounted on a variety of carrier elements, depending on the desired use and notably, because of the flexibility, contoured surfaces are readily facilitated, as well as carriers that are also flexible. As an example of the latter, semi-tractor trailers are made in which the trailer body is provided with a skeleton of frame members, to which a tarpaulin or canvas member can be affixed to provide a covered trailer. The retroreflective articles of the present invention can be applied directly to the tarpaulin member and provide various reflective indicia as may be required by local law or for other purposes. First, the indicia could be formulated in the article, then the article is applied to the tarpaulin with the use of the adhesive layer. Alternatively, retroreflective indicia could be applied directly to the tarpaulin material through heat/pressure lamination, during tarpaulin construction or post construction.

Figure 9:
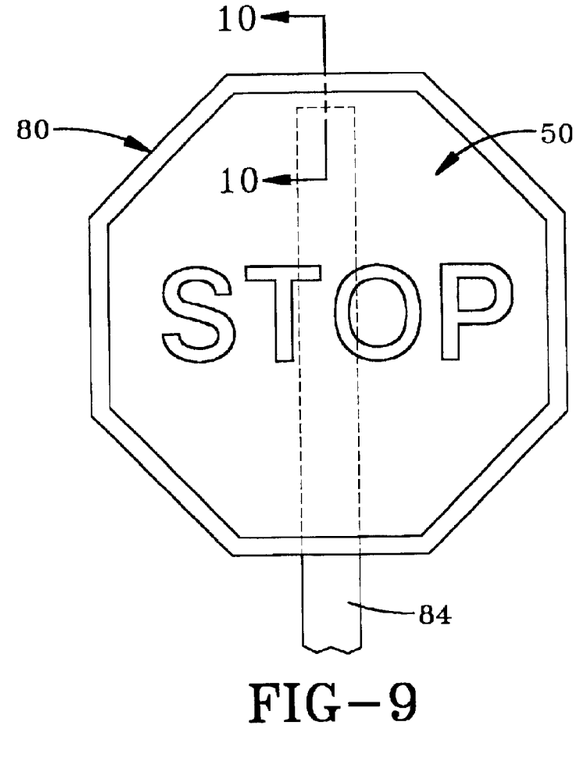
FIG. 9 is a front elevation of a product utilizing the retroreflective article of the present invention.
Figure 10:
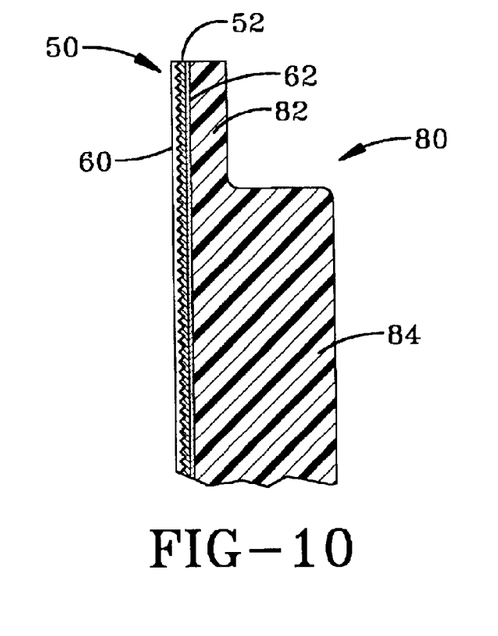
FIG. 10 is a cross-section, taken substantially along the line 10—10 of FIG. 9.

Another example is depicted in FIGS. 9 and 10, in the form of a conventional stop sign, indicated generally by the numeral 80. The sign 80 can be molded from a suitable plastic to form a sign body 82 and unitary mounting post 84. In this manner, the sign is less susceptible to theft. Depending upon the plastic selected, the sign can be made to break-away when struck or, it can flex without breaking. Alternatively, the sign can be provided with a mounting bracket (not shown) or other means for receipt of a conventional pole member, which can be plastic, wood, metal or the like. On the front face of sign body 82, the retroreflective article 50 of the present invention is affixed, via adhesive layer 62 or during molding of the sign by inserting the retroreflective material into the sign mold cavity. The nanoporous material on the back of the reflective material layer bonds directly to the plastic. The appropriate letters "STOP" or other indicia are provided onto the nanoporous substrate 52.

Thus, it should be evident that the article and method of the present invention are highly effective in providing a highly retroreflective surface. The invention is particularly suited for reflective fabrics and films, but is not necessarily limited thereto.

Based upon the foregoing disclosure, it should now be apparent that the use of the reflective article and method of producing the same, described herein, will carry out the objects set forth hereinabove. It is, therefore, to be understood that any variations evident fall within the scope of the claimed invention and thus, the selection of specific component elements can be determined without departing from the spirit of the invention herein disclosed and described. In particular, reflective layers according to the present invention are not necessarily limited to aluminum, chromium, nickel, silver, and gold or dielectrics. Moreover, as noted hereinabove, other nanoporous substrates and films can be substituted for the microporous substrates. Thus, the scope of the invention shall include all modifications and variations that may fall within the scope of the attached claims.

What is claimed is:

1. A retroreflective article comprising:
    a) a microporous substrate containing a plurality of pores which are less than 0.5 μm in diameter; and
    b) a layer of reflective material, selected from the group consisting of metal coatings and dielectric coatings, wherein said layer of reflective material is in direct contact with the surface of the substrate such that said layer at least partially obscures a plurality of the pores of the substrate.

2. A retroreflective article, as set forth in claim 1, additionally comprising a protective coating material layer, overlying said layer of reflective material.

3. A retroreflective article, as set forth in claim 2, wherein said protective coating material is selected from the group consisting of polyurethanes, polymethylmethacrylate and copolymers thereof, styrene-acrylonitriles, polystyrene, polycarbonate, organosiloxanes, amorphous polyolefins, evaporative dielectric coatings and other transparent materials.

4. A retroreflective article as set forth in claim 1, wherein said substrate contains a plurality of pores which have diameters which are less than 450 nm.

5. A retroreflective article, as set forth in claim 4, wherein said substrate is a fabric.

6. A retroreflective article, as set forth in claim 1, wherein said substrate is comprised of a nanoporous polymeric film.

7. A retroreflective article, as set forth in claim 6, wherein said substrate is selected from the group consisting of polyethylene, polytetrafluoroethylene, polypropylene, polyethylene terephthalate, polymethylmethacrylate and polyacetate.

8. A retroreflective article, as set forth in claim 1, wherein said reflective material layer is a metal coating.

9. A retroreflective article, as set forth in claim 8, wherein said reflective material is selected from the group consisting of aluminum, chromium, nickel, silver and gold.

10. A retroreflective article, as set forth in claim 9, wherein said reflective material is aluminum.

11. A retroreflective article, as set forth in claim 10, wherein said reflective material layer has a thickness of between about 0.001 to about 0.0001 inch.

12. A retroreflective article, as set forth in claim 1, wherein an optical performance enhancing characteristic has been introduced into said article.

13. A retroreflective article, as set forth in claim 12, wherein said optical performance enhancing characteristic is a repeating corner cube design.

14. A retroreflective article, as set forth in claim 1, additionally comprising an adhesive layer located on a surface of said substrate opposite to the surface on which said reflective material layer is deposited.

15. A retroreflective article, as set forth in claim 1, affixed to a carrier substrate member via said adhesive layer.

16. A method for the production of a reflective article comprising the steps of:
    a) providing a substrate which contains pores which have a diameter of less than 0.5 microns; and
    b) applying a layer of reflective material directly to the substrate in such a way that said layer at least partially obscures a plurality of the pores of the substrate, wherein said layer of reflective material is selected from a group consisting of metal coatings and dielectric coatings.

17. The method, as set forth in claim 16, further comprising the step of applying a protective layer to said reflective article, overlying said layer of reflective material.

18. The method, as set forth in claim 17, wherein said protective coating material is selected from the group consisting of polyurethanes, polymethylmethacrylate and copolymers thereof, styrene-acrylonitriles, polystyrene, polycarbonate, organosiloxanes, amorphous polyolefins, evaporative dielectric coatings and other transparent materials.

19. The method, as set forth in claim 16, wherein said reflective material is a metal coating.

20. The method, as set forth in claim 19, wherein said metal coating is selected from the group consisting of aluminum, chromium, nickel, silver and gold.

21. The method, as set forth in claim 20, wherein said metal coating is aluminum and has a thickness of between 0.001 to about 0.0001 inch.

22. The method, as set forth in claim 16, further comprising the step of processing said article to introduce optical performance enhancing characteristics.

23. The method, as set forth in claim 22, wherein said step of processing to introduce optical performance enhancing characteristics comprises embossing said article using calendar rolls or flat plates.

24. The method, as set forth in claim 23, wherein said step of processing includes heating said calendar rolls.

25. The method, as set forth in claim 23, wherein said step of processing to introduce optical performance enhancing characteristics includes introducing a repeating corner cube design into said reflective layer.

* * * * *